INVENTOR
DANIEL MULLAN
ATTORNEY

INVENTOR
DANIEL MULLAN
BY
ATTORNEY

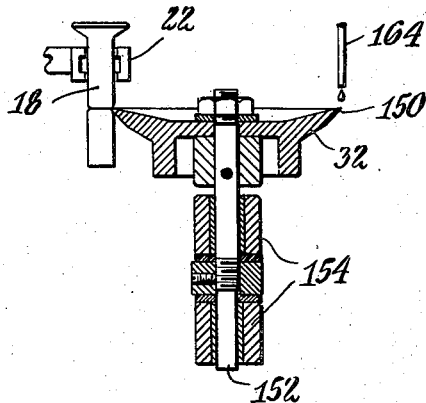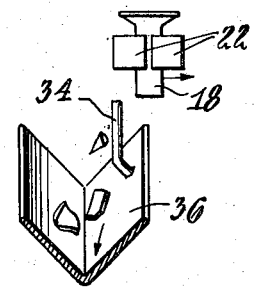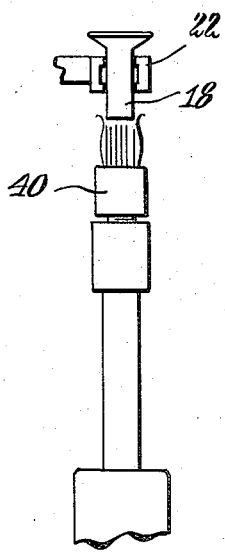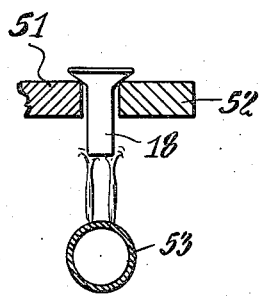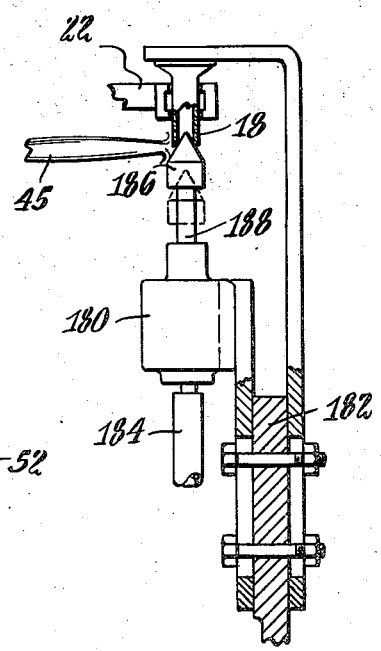

United States Patent Office 2,857,044
Patented Oct. 21, 1958

2,857,044
AUTOMATIC HOT CUT "LAST" FLARE RECLAIMING MACHINE

Daniel Mullan, Hillside, N. J., assignor to Westinghouse Electric Corporation, East Pittsburgh, Pa., a corporation of Pennsylvania Application February 2, 1953, Serial No. 334,681

2 Claims. (Cl. 198—210)

The present invention relates to lamp making machinery and, more particularly, to an automatic hot cut "last" flare reclaiming machine.

A flare is a piece of glass tubing on which a flange or flared portion is formed for subsequent sealing to a vitreous envelope of an incandescent lamp or the like. Flares are made on automatic flare machines wherein the standarized precut lengths of glass tubing are placed in suitable holding means mounted on a rotatable carrier. The end of the tubing is then heated and flanged, the length of the flare to be cut from the tubing is gauged, and the flare is cut from the tubing all by automatic means.

Despite the automatic high speed production of flares a considerable waste of glass tubing is involved, since the "last" flare made from each piece of glass tubing is usually much longer then the desired specified length, and cannot therefore be used in making an incandescent lamp mount. This condition cannot be remedied on the automatic flare making machine itself as the tubing holding means on the carrier requires greater gripping length than is provided by the "last" flare. In the past the "last" flare from each piece of tubing has been considered as "cullet," scrapped, and fed to a glass furnace for reprocessing. This practice not only involves additional expensive handling and processing but does not untilize the "last" flares to the best advantage.

Hence, it has been found advantageous, according to my invention, to provide an automatic hot cut "last" or overlong sized flare reclaiming machine which reduces the excessive waste of "last" flares, is automatic in its operation, and requires only the periodic attention of a machine attendant to supply a new batch of long flares to the hopper.

My "last" flare reclaiming machine comprises essentially a rotatable turret moved from station to station by an indexing mechanism and carrying a plurality of, for example, eight flare holding heads. At Station "1," the "last" flare to be reclaimed is automatically fed by a stem machine flare hopper into the now open flare holding jaws. At Station "2," a gauging or vertically positioning unit positions the flare in the now closed jaws. At Station "3" a rotating oxy-hydrogen fire from a rotating burner heats the flare and thereby sets up a sharp strain therein at the desired cut-off line. Between Stations "3" and "4," the flare contacts a cold wheel which completes the strain therein as a further step toward severance at that line. Adjacent the wheel a knock-off rod projecting from a cullet discharge chute engages the lower portion of the flare and effects cut-off at the line of strain. At Stations "4" and "5" a stationary burner glazes the cut-off end of the flare. At Station "6" a similar stationary burner completes the glazing and also anneals the bottom portion of the flare. At Station "7" a plurality of stationary burners maintains the cut-off end of the flare in a semi plastic condition and a reciprocating reamer forms a very slight flare therein. At Station "8" the flare-holding jaws are automatically opened, and the reclaimed flare is dropped through a discharge chute into a circular annealer from where they are periodically transported to the stem making machines in the conventional manner.

In its general aspect, the present invention has as an objective the production of an automatic hot cut "last" flare reclaiming machine which reduces the waste of the "last" flares, is automatic in its operation, and requires only the periodic manual loading of the flare hopper.

Other objects of the invention will become apparent to those skilled in the art to which it appertains as the description proceeds.

With reference to the drawings, in which like numerals of reference indicate similar parts throughout the several views:

Fig. 7 is a fragmentary vertical sectional view of the cold wheel, showing the flare in contact therewith between Stations "3" and "4" for starting a crack in the flare, on the line VII—VII of Fig. 1, in the direction of the arrows.

Fig. 8 is a fragmentary vertical sectional view showing the knock-off rod on the cullet discharge chute, adjacent Station "4" on the line VIII—VIII of Fig. 1, in the direction of the arrows.

Fig. 9 is a fragmentary vertical sectional view of the stationary glazing fire at Stations "4," "5" and "6," on the line IX—IX of Fig. 1, in the direction of the arrows.

Fig. 10 is a fragmentary vertical sectional view of the reciprocable reamer for forming the now glazed cut-off end of the flare at Station "7," on the line X—X of Fig. 1, in the direction of the arrows.

Fig. 11 is a fragmentary vertical sectional view of the rotatable circular annealer, on the line XI—XI of Fig. 1, in the direction of the arrows.

Figure 1:
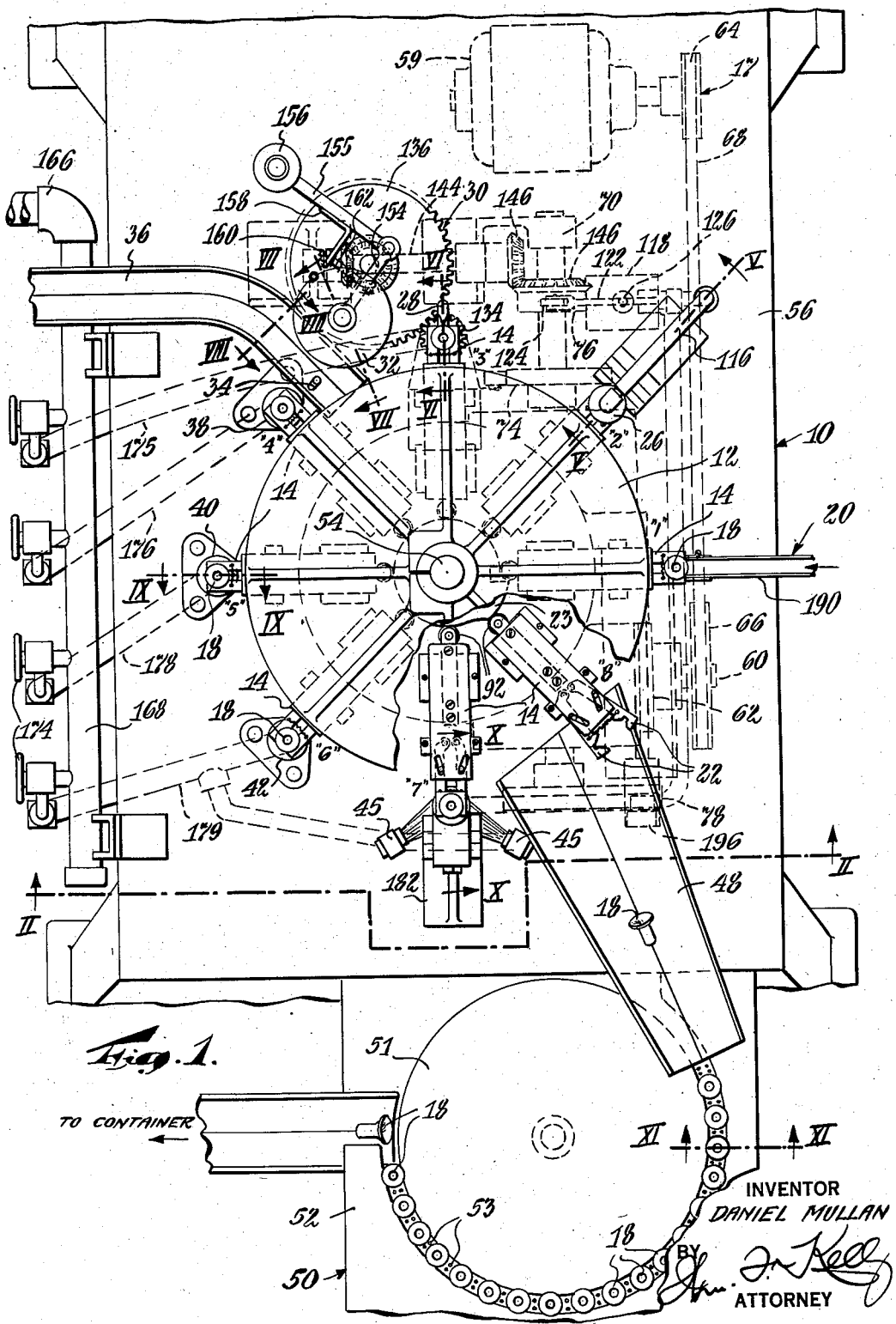
Fig. 1 is a plan view partially broken away of the hot cut "last" flare reclaiming machine of my invention.
Figure 2:
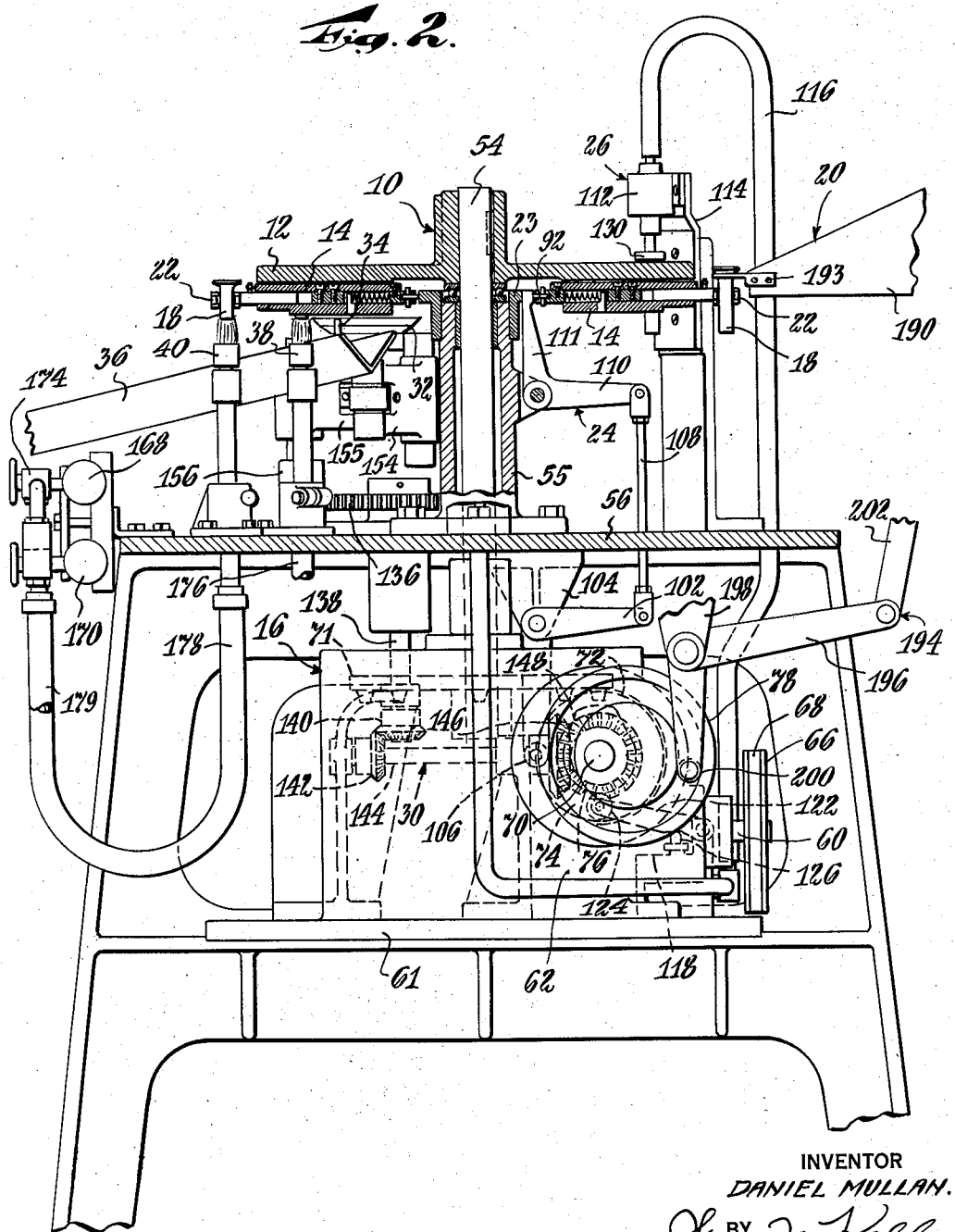
Fig. 2 is a vertical sectional view of the machine on the line II—II of Fig. 1, in the direction of the arrows, showing the flare-holding jaw mechanism in the closed position at Station "1."

Referring to the drawings in detail, and particularly to Figs. 1 and 2, the hot cut "last" flare reclaiming machine of my invention is designated generally by the reference numeral 10. The machine 10 has a rotatable turret 12, provided with a plurality of flare-holding heads 14, eight, for example, in the showing of Fig. 1, and moved thru a plurality of stations by an indexing mechanism 16 (Fig. 2), which in turn is operated by driving mechanism 17 of the machine 10.

Figure 3:
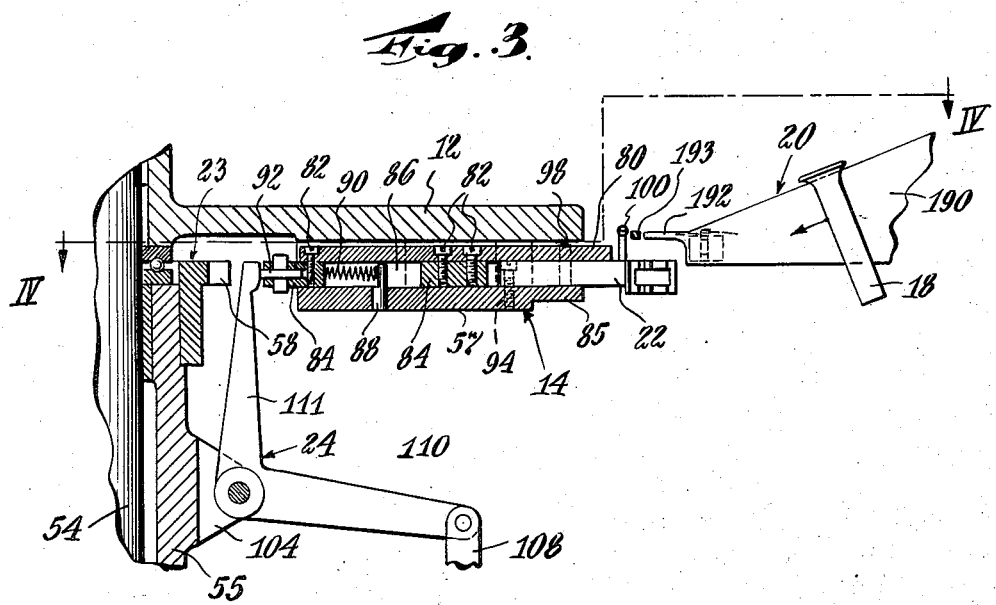
Fig. 3 is an enlarged fragmentary vertical sectional view of the flare holding jaw operating mechanism in the open position at Station "1."

At Station "1" a "last" (overlong) flare 18, hereinafter referred to as a flare 18, is fed automatically from a stem machine flare hopper 20 into a pair of normally closed flare holding jaws 22 (Figs. 3 and 4) of a head 14, which have been opened by means of a stationary cam 23. These jaws are held open at Station "1" for a predetermined time by means of flare-holding jaw operating or restraining and releasing mechanism 24 (Fig. 3). A gauging or positioning unit 26 (Fig. 5) at Station "2" positions the flare 18 vertically in the now closed jaws 22 for the desired cut-off. An oxy-hydrogen burner 28 (Fig. 6) at Station "3," rotated by means of a burner-rotating mechanism 30, heats and thereby induces a sharp strain in the flare 18 at the gauged cut-off line. During indexing of the head 14 between Stations "3" and "4," the flare 18 successively contacts a cold wheel 32 (Fig. 7), which further weakens it at the cut-off line, and then a knock-off rod 34 (Fig. 8) mounted on a cullet discharge chute 36.

At Stations "4" and "5" stationary burners 38 and 40 (Fig. 9) glaze or fire polish the cut-off end of the flare 18. A similar stationary burner 42 at Station "6" completes the glazing and also anneals said bottom portion of the flare 18. A plurality of stationary plasticizing burners 45 (only one of which is shown in Fig. 10), continues the heating of the cut-off end of the flare 18 and a reciprocable reamer 46 (Fig. 10) at Station "7" froms or flares slightly the cut-off end of the flare 18, so that lead wires, etc. may be more readily inserted therein during stem making. At Station "8" the flare holding jaws 22 are opened by the stationary cam 23 and the reclaimed flare is dropped through a discharge chute 48 into a circular annealer 50 (Fig. 11). This annealer 50 has a continuously rotating disc 51 for moving the reclaimed flares 18 through an annular groove between the disc 51 and a stationary annular ring 52. A series of burners 53 disposed beneath said groove anneal the flares.

Turret

The hub of the turret 12 is keyed (Fig. 2) to a vertical shaft 54 which, in turn, is journalled in a pedestal 55. This pedestal is secured by means of its lower flanged portion (Fig. 2), as by bolts, to the top (Fig. 2) of a table 56. The pedestal 55 and the table 56 constitute the frame of the machine 10.

Figure 4:
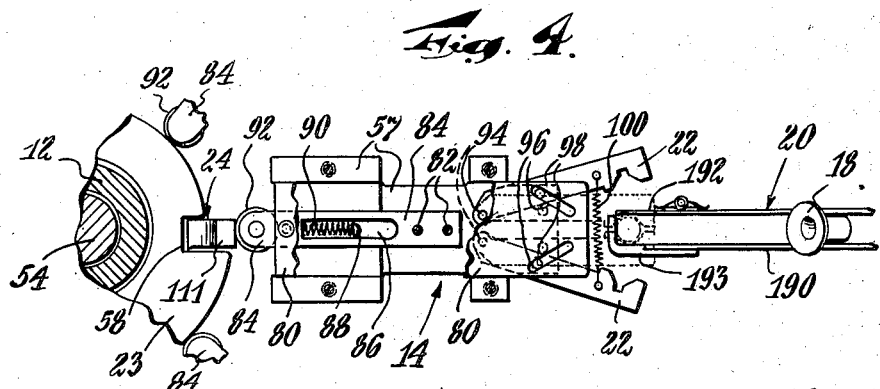
Fig. 4 is a fragmentary horizontal sectional view of the flare holding jaw operating mechanism on the line IV—IV of Fig. 3, in the direction of the arrows.

A flare jaw housing or guide bracket 57 of each head 14 is of generally U-shaped vertical section and is affixed, as by bolts, thru its flanged right and left hand end portions when viewed in Fig. 4, to the underside of the turret 12. Adjacent the inner portion of each head 14, the stationary horizontal jaw-opening cam 23 is fixed to the pedestal 55. This cam has a high dwell adjacent Stations 8 and 1 (for opening and holding open the jaws 22, as hereinafter explained), which extends to a jaw-operating mechanism slot 58 in the cam 23 at Station "1".

Driving, indexing and timing mechanisms

The driving mechanism 17 comprises essentially a motor 59 (Fig. 1) mounted on a bottom platform 61 (Fig. 2) of the table 56 for driving a shaft 60 of a speed-reducing unit 62 by means of pulleys 64 and 66 and a connecting belt 68. The shaft 60 (Fig. 2) in turn drives, by means of reduction gears (not shown), an indexing and timing shaft 70 (Fig. 2) of the machine 10 at a speed of one revolution per indexing cycle.

The indexing mechanism 16 comprises a conventional turret roller plate 71 (Fig. 2), which has sequentially arranged tapered rollers and is fixed to the vertical turret shaft 54 below the top of the table 56 and adjacent to an indexing cam 72 (Fig. 2) on the shaft 70.

Also, on the indexing and timing shaft 70 are a jaw operating mechanism cam 74, two way valve operating cam 76 and a stem machine flare hopper operating cam 78 (Fig. 2). These cams 72, 74, 76 and 78 and the shaft 70 from the timing mechanism of the machine 10.

Head

In addition to the bracket 57, each of the flare holding heads 14 comprises, as shown in Figs. 3 and 4, a top slide plate 80 secured, as by three bolts 82 (Fig. 3), to a spacing member 84, suitably of a smaller width than the plate 80. The plate 80 and its connected member 84 are slidable, as hereinafter explained, in their respective longitudinal slots in the guide bracket 57. The member 84 is provided with a clearance slot 86 for a recovery spring pin 88 (Fig. 3) which projects from the bottom portion 85 of the bracket 57 and secures one end of a compression spring 90 thereon. The other end of the spring 90 is suitably secured to the spacing member 84 at the left hand end of the slot 86, as viewed in Fig. 3. The left hand end of spacing member 84 (as viewed in Fig. 3) is horizontally bifurcated and projects beyond the bracket 57 and the slide plate 80, and carries a cam roller 92 therein.

As shown in Fig. 4 the jaws 22 on the forward end of each head 14 are pivoted (on the bottom portion 85 of the bracket 57 by means of pins 94) between the slide plate 80 and the bottom portion 85 of the bracket 57 and are free to swing laterally between their open and closed positions. The slide plate 80 is provided with jaw-operating slots 96 in which a jaw operating pin 98 (projecting upwardly from each jaw 22) extends. An actuating spring 100 extends from one jaw to the other and maintains proper grip on a flare 18 when held therebetween.

It will be understood that as a head 14 indexes from Station "7," the end reaming or forming station, to Station "8," the discharge station, the cam roller 92 rides up the gradually inclined portion of the stationary cam 23, as shown in Fig. 1, thus moving the slide plate 80 and the slotted spacing member 84 affixed thereto, outwardly in the bracket 57 or to the right when viewed in Fig. 3. The jaw operating pins 98, and the jaws 22, are pivoted outwardly from the longitudinal axis of the head 14 by the slide plate jaw operating slots 96, thus opening said jaws 22 and permitting the reclaimed flare 18 to drop therefrom along the discharge chute 48 into the circular annealer 50 Station "8."

Between Stations "8" and "1," the continued high dwell portion of the stationary cam 23 maintains the jaws in the open position. The jaw operating mechanism 24 (Fig. 4) which is operable in the slot 58 provided in stationary cam 23 at Station "1," maintains the jaws 22 in the open position at Station "1" until a flare 18 has been delivered by the stem machine flare hopper 20, as hereinafter explained.

The flare-holding jaw-operating mechanism

The operating mechanism 24, shown particularly in Figs. 2, 3, and 4, has a bell crank lever 102 pivoted on a bracket 104 which depends from the underside of the table 56. The lower end of the lever 102 carries a cam roller 106 (Fig. 2) for engagement with the jaw operating mechanism cam 74 on the indexing and timing shaft 70. A connecting rod 108 joins the other end of the lever 102 to a second bell crank lever 110, suitably pivoted on the pedestal 55. The upper or operating end 111 of the lever 110 is formed to be engaged by the cam roller 92 on the spacing member 84 of the head 14, and to move to carry said roller 92 from the high dwell to the low dwell of the stationary jaw-operating cam 23. It will be understood that this upper end 111 of the lever 110 swings back and forth in the jaw operating slot 58 provided in the stationary cam 23 at Station "1."

As the head 14 indexes from Station "8," the discharge station, to Station "1," the loading station, the upper end 111 of the lever 110 (Fig. 4) is in its forward position and functions as a continuation of the high dwell of stationary cam 23. After a flare 18 has been delivered to the now open jaws 22 at Station "1," the cam 74 is timed so that the roller 106 leaves the high dwell of the jaw-operating mechanism cam 74 and moves to the right, as viewed in Fig. 2, thus causing the connecting rod 108 to move upwardly, and hence the upper end 111 of the bell crank lever 110 to swing to the left (when viewed in Figs. 2 and 3), into the rearward portion of the jaw operating slot 58 of the stationary cam 23. In this position the upper end 111 of the lever 110 coincides with the low dwell of the stationary cam 23, as shown in Fig. 2.

It will be understood that the retreating motion or inward movement axially toward the center of the turret 12 of the upper end 111 of the lever 110 and the compressive action of the spring 90 against the forward portion of the spacing member 84, causes the plate 80 and the spacing member 84 to follow said upper end 111 of the lever 110. The inward motion of the slotted plate 80 closes the jaws 22 about the positioned flare 18 located thereat.

Vertically positioning unit

Figure 5:
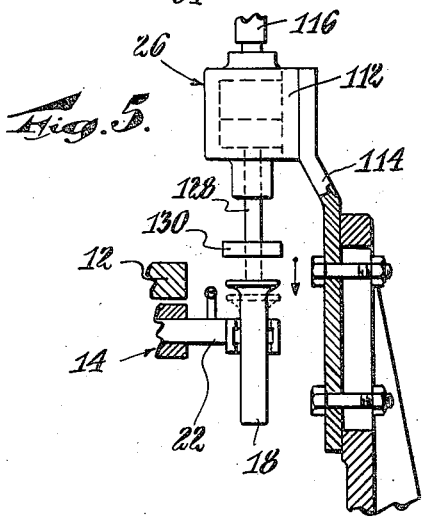
Fig. 5 is a fragmentary vertical sectional view of the gauging unit at Station "2" on the line V—V of Fig. 1, in the direction of the arrows.

The vertically positioning unit 26, shown in Figs. 1, 2 and 5, has an air cylinder 112, adjustably mounted on a bracket 114 extending upwardly from the top of the table 56. This cylinder is connected by means of a line 116 (Fig. 2) to a two-way air valve 118 fixed to the bottom platform 61 of the reducing unit 62, adjacent the shaft 60 of the reducing unit 62, and the two-way air valve operating cam 76 on indexing and timing shaft 70 of the machine 10. A cam lever 120 (Fig. 2) is pivoted on an upward extension 122 of the two-way air valve housing, and carries, on its free end a cam roller 124 (Fig. 1). The roller 124 is maintained in engagement with the operating cam 76 by a spring-biased air valve release button 126, which contacts the underside of the cam lever 120. An operating rod 128 of the air cylinder 112 depends from a piston in said cylinder and carries a flare-positioning button or disc 130.

It will be understood that as a head 14 is indexed from Station "1," the flare loading station, to Station "2," the gauging station, that the roller 124 on the lever 120 is in engagement with a low dwell of the air valve operative cam 76 and hence the air valve 118 is closed. Since no air is flowing through the air cylinder 112, the positioning button 130 is in its upper or normal position. At a predetermined time after the arrival of a flare 18 in the head 14 at Station "2," the cam roller 124 engages the high dwell of the cam 76, thus depressing the release button 126 of the air valve 118 opening said valve, and causing, through air pressure, the downward movement of the operating rod 128, and moving the positioning button 130 thereon into engagement with the top of the flare 18 held in the jaws 22 of the head 14.

The lowermost position of the button 130, shown in Fig. 5, is determined by the position of the air cylinder 112 on the mounting bracket 114. The flare 18 in the jaws 22 is pushed downwardly the proper distance for effecting the desired cut-off of the flare 18 undergoing reclamation.

Oxy-hydrogen burner and rotating mechanism

Figure 6:
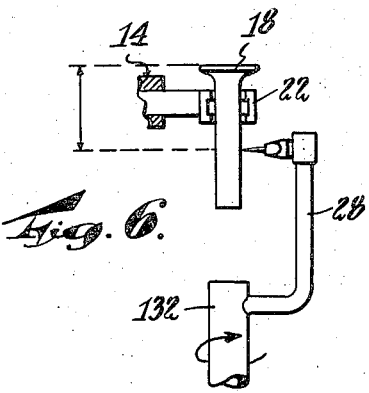
Fig. 6 is a fragmentary vertical sectional view of the rotating strain-producing burner at Station "3" on the line VI—VI of Fig. 1, in the direction of the arrows.

At Station "3," the vertically adjustable oxy-hydrogen burner 28, shown particularly in Fig. 6, is mounted on and radially off-set from a hollow shaft functioning as the fuel supply pipe 132. The adjustable pointed strain-producing flame from the burner 28 is directed at the desired cut-off point, as predetermined by the vertically positioning unit 26 at Station "2". The burner 28, and hence the flame therefrom, rotate in a circle about the stationary flare 18 held in the jaws 22 of the head 14. The burner 28 is rotated by the burner-rotating mechanism 30.

The burner rotating mechanism 30 (Figs. 1 and 2) has a gear 134 affixed to the fuel supply pipe 132, for engaging a horizontal driver gear 136 (Fig. 2). This gear 136 is fixed to a vertical shaft 138 carrying a bevel gear 140 on its lower end. A second bevel gear 142 on a horizontal shaft 144 meshes with the bevel gear 140 on the left hand end of the shaft 144, as viewed in Fig. 2. A bevel gear 146 on the opposite end of shaft 144 engages another bevel gear 148 on the indexing and timing shaft 70 (Fig. 1).

From the above description of the gear train or burner rotating mechanism 30, it will be apparent that continuous rotating motion is transmitted from the shaft 70 to the rotating burner 28. It will be understood that the indexing mechanism 16, of the machine 10 is timed to index a head 14 to Station "3" when the burner 28 is out of the indexing path.

As the head 14 indexes from Station "3" to Station "4," the now strained cut-off line on the flare 18 contacts the cold wheel 32.

Cold wheel

The cold wheel 32, shown in Figs. 1, 2 and 7 is a disc-like body desirably formed of steel and having an annular knife edge 150 (Fig. 7). It is adjustably mounted on a vertical shaft 152. This shaft 152 is mounted on the outer extremity of a rotatable wheel arm 154. The arm 154 is pivoted on a stationary arm 155 affixed to a suitable column or pedestal 156 (Fig. 1). This pedestal 156 is mounted on the top of the table 56, as by means of brackets. An angle iron 158, secured to the stationary arm 155 has its free flange disposed generally parallel to the rotatable arm 154. A bolt 160 extends through the arm 154 and the free flange of the angle 158, and carries a compression spring 162 thereabout. A nut on the outwardly extending portion of the bolt 160 maintains the desired compression on the cold wheel 32 for properly contacting the strained cut-off line on the flare 18.

The wheel 32, and more particularly the knife edge 150 of the said wheel, is kept cold by droplets of water deposited thereon (Fig. 7) from an outlet 164 of a cold water supply (not shown).

If the contact between the strained cut-off line on the flare 18 and the cold knife edge 150 of the wheel 32 is still insufficient to sever the undesired cullet portion of the flare 18, this cullet portion comes into contact with the knock-off rod 34 mounted on the cullet discharge chute 36 therebeneath. The head 14, and the now de-culleted flare 18 continue counterclockwise to Station "4"

At Station "4," "5," and "6" the glazing burners 38, 40 and 42, respectively similar to burner 40, shown in Fig. 9, heat the cut-off end of the deculleted flare 18 to smooth or glaze any sharp or ragged edges thereon. These burners, and the rotating burner 28 are fed from a gas supply system 166 (Fig. 1).

Gas supply system

The gas supply system 166, shown particularly in Figs. 1 and 2, comprises oxygen and hydrogen manifolds 168 and 170 respectively mounted as by means of brackets, on the top of the table 56, a series of mixers 171 thru 174 connected to the manifolds 168 and 170, and a series of flexible connections 175 thru 179 for carrying the oxy-hydrogen gas mixture from the mixers to the burners 28, 38, 40, 42 and 45, respectively.

Reamer unit

The reamer unit 46, shown in Fig. 10 and located at Station "7" has an air cylinder 180 adjustably mounted, as by means of brackets, on a suitable pedestal 182. This cylinder 180 is connected by a flexible air line 184 to the air valve 118, and carries a conically-ended reamer 186 on its operating rod 188. The stationary burners 45 disposed about the glazed cut-off end of the flare 18, maintain a semiplastic condition thereat which facilitates the forming operation.

It will be understood that as a head 14 indexes to Station "7" the two-way valve 118 is closed and the reamer 186 is in its normal or lower position. As the two-way air valve operating cam 76 opens the valve 118, compressed air is admitted into the air cylinder 180, thus pushing the reamer 186 into contact with the glazed and still plastic cut-off end portion of the flare 18. At a predetermined time before the end of the operating portion of the index period, the cam 76 closes the valve 118 and the reamer 188 reciprocates to its normal position.

Stem machine flare hopper

The flare hopper 20, shown only partially in Figs. 1 to 4, inclusive, is a conventional stem-machine flare hopper having a discharge chute 190. This chute 190 has a hinged end portion 192 on its side rail facing Station "2" and an L-shaped stationary end portion 193 on its other side rail. After the flare 18 has been delivered into the jaws 22 of a head 14 of Station "1," the flare is held simultaneously by the jaws and the end portions 192 and 193 of the guide rails of the chute 190. As the head 14 indexes from Station "1" to Station "2," the hinged end portion 192 swings outwardly to release the flare 18 from the chute 190. Spring action in the hinged portion 192 returns said end portion to its normal or loading position after the flare 18 has left the chute 190.

A stem machine hopper feed driving mechanism 194, the essential parts of which are shown in Fig. 2, has a bell crank lever 196 pivoted on a bracket 198 which depends from the underside of the top of the table 56. The lower end of the lever 196 carries a cam roller 200 which engages the stem machine flare hopper operating cam 78. A connecting rod 202, part of which is shown in Fig. 2, is secured to the other end of the lever 196. The remainder of the connecting mechanism for transmitting motion from the cam 78 to the stem machine flare hopper 20 is not shown.

*Operation*

As each head 14 of the machine 10 indexes from Station "8," the discharge station, to Station "1," the loading station, the cam roller 92 on the inner end of the head 14 is riding on the high dwell of the stationary cam 23, and hence the jaws 22 remain in the open position. When the head reaches Station "1," the roller 92 engages the upper end 111 of the bell crank lever 110 of the flare holding jaw operating mechanism 24 and the jaws remain open sufficiently long for a flare 18 to be delivered from the stem machine flare hopper 20 thru the discharge chute 190 into position on the end portions 192 and 193 of the chute rails.

At a predetermined time, the roller 106 on the bell crank lever 102 of the jaw operating mechanism 24 engages the high dwell of the jaw operating mechanism cam 74 and the upper end 111 of the bell crank lever 110 moves into the rear portion of the operating slot 58 provided in the stationary cam 23, thus permitting the jaws 22 to close about the flare 18. The head 14 then indexes from Station "1" to Station "2," the gauging station.

At Station "2" the cam roller 124 on the end of the lever 120 of the gauging unit 26 rides up a raised portion of the two-way valve operating cam 76, thus depressing the air valve release button 126, actuating the air valve 118, and simultaneously causing the flare positioning button 130 on the end of the air cylinder operating piston 128 to engage the upper end of the flare 18, and position said flare in the jaws 22 with the desired cut-off line aligned with respect to the strain producing rotating burner 28 at Station "3" and the cold wheel 32 and knock-off rod 34 between Stations "3" and "4."

At Station "3" the pointed flame from said burner 28 produces a strain in the lower end of the flare 18 at the desired cut-off line. Between stations "3" and "4" the strained line on the flare 18 engages the cold knife edge 150 of the wheel 32, thus completing the strain at the line of cut-off. If the cullet end of the flare 18 is not removed by contact with the wheel 32, the flare 18 then engages the knock-off rod 34 on the cullet discharge chute 36, and the cullet portion of the flare is removed therefrom.

At Stations "4," "5" and "6" the glazing burners 38, 40 and 42 respectively, glaze the cut-off end of the flare 18, and maintain said end of the flare 18 in a semiplastic state so that, upon indexing to Station "7," the plurality of stationary burners 45 situated thereat are able to maintain the plastic condition on the end portion of the flare 18, which is required for a slight flaring and rounding thereof.

After the head 14 has indexed to Station "7," the reamer unit 46 is operated simultaneously with the vertically positioning unit 26 at Station "2," by action of the two-way valve operating cam 76 on the indexing and timing shaft 70. Air pressure is simultaneously delivered to both of the units 26 and 46. The conical reamer 186 on the operating plunger 188 of the air cylinder 180 is moved upwardly thereby a predetermined amount, as shown in Fig. 10, into contact with the plastic end portion of the glazed flare 18, to round and to slightly flare the cut-off end of said flare.

As the head 14 indexed between Station "7" and "8," the cam roller 92 on the spacing member 84 of the head 14 engages the high dwell of the stationary cam 23, thus opening the jaws 22 of said head at Station "8," and releasing the glazed reclaimed flare 18 to a discharge chute 48 for delivery to the circular annealer 50, shown in Figs. 1 and 11. After annealing, the flares are delivered by a chute 204 to either a container or conveyor for storage or transmission to a stem machine.

Although a preferred embodiment of my invention has been disclosed, it will be understood that modifications may be made within the spirit and scope of the invention.

I claim:

1. In combination for a hot cut last flare reclaiming machine having a pedestal, a vertical shaft journalled in said pedestal and a rotatable turret on said shaft, a flare holding mechanism including jaws on said turret and a flare holding jaw operating mechanism on said pedestal for closing of said jaws, said operating mechanism comprising a stationary cam on said pedestal for opening said jaws and provided with a slot therein, a lower cam engaging bell crank lever pivoted on said machine, an upper bell crank lever pivoted on said pedestal and having its upper end engageable with said flare holding mechanism and reciprocable in said slot and means for connecting said upper and lower levers.

2. In combination for a hot cut last flare reclaiming machine having a pedestal, a vertical shaft journalled in said pedestal and a rotatable turret on said shaft, a flare holding mechanism comprising a jaw housing, a top slide plate slidable in said housing and provded with a pair of jaw operating slots therein, a spacing member secured to said slide plate and provided with a clearance slot, a pair of flare holding jaws pivoted on said housing and provided with jaw operating pins projecting into said jaw operating slots and closing means in said clearance slot between said spacing member and said housing for closing said jaws, and a flare holding jaw operating mechanism on said pedestal for closing of said jaws and comprising a stationary cam on said pedestal for opening said jaws and provided with a slot therein, a lower cam engaging bell crank lever pivoted on said machine, an upper bell crank lever pivoted on said pedestal and having its upper end engageable with said flare holding mechanism and reciprocable in said slot and means for connecting said upper and lower levers.

References Cited in the file of this patent

UNITED STATES PATENTS

| | | |
|---|---|---|
| 223,022 | Bacon | Dec. 30, 1879 |
| 1,251,541 | Knight | Jan. 1, 1918 |
| 1,493,044 | Leiman | May 6, 1924 |
| 1,508,358 | Brown | Sept. 9, 1924 |
| 2,296,935 | Langer | Sept. 29, 1942 |
| 2,323,182 | Stuckert | June 29, 1943 |
| 2,349,197 | Rehfeld | May 16, 1944 |
| 2,362,115 | Cline | Nov. 7, 1944 |
| 2,504,842 | Juvinall et al. | Apr. 18, 1950 |
| 2,534,547 | Eisler | Dec. 19, 1950 |
| 2,641,870 | Eisler | June 16, 1953 |

FOREIGN PATENTS

| | | |
|---|---|---|
| 388,878 | Great Britain | Mar. 9, 1933 |